United States Patent Office 3,037,970
Patented June 5, 1962

3,037,970
COPOLYMER OF AN UNSATURATED SIDE CHAIN AROMATIC COMPOUND AND AN ALKYLENE DIAMINE
Edward M. Geiser, Downers Grove, Ill., assignor to Universal Oil Products Company, Des Plaines, Ill., a corporation of Delaware
No Drawing. Filed Feb. 16, 1959, Ser. No. 793,286
11 Claims. (Cl. 260—93.5)

This invention relates to an improved process for the preparation of copolymers and particularly to a process for the copolymerization of an aromatic compound containing an unsaturated side chain with an alkylene diamine. More particularly the invention is concerned with a process for the copolymerization of an alkene substituted aromatic hydrocarbon with a tetra substituted alkylene diamine.

An important factor in the polymerization of olefins or the copolymerization of olefins with diolefins, olefins of dissimilar nature or, as is the case in the present process, an alkylene diamine, is the control of temperature by means of a reaction rate controlling medium during the polymerization or copolymerization reaction. The rigid control of temperature during the formation of the polymer or copolymer is considered a critical factor in obtaining the desired product inasmuch as this factor is believed to determine the manner in which the monomer or monomers condense to form a polymer or copolymer. The fundamentally different reaction mechanism involved in the formation of an insoluble solid copolymerization or polymerization product as distinguished from a liquid product or a semi-solid product is based on the fact that the different copolymerization or polymerization products which are recovered are based on the difference in temperatures at which the reaction proceeds. Therefore, the temperature of the reaction mixture, particularly the point of polymer formation, is a factor of special importance in controlling the direction of the polymerization. It has now been discovered that control of this vital factor is effected, in the process of the present invention, by a solvent which absorbs a large quantity of heat which is liberated by the highly exothermic reaction at the point of polymer formation.

An alternative arrangement for externally cooling the reaction mixture accompanied by rapid and thorough mixing of the monomers comprising the charge stock at the point of introducing the polymerization catalysts may likewise be employed, although said method is not the generally preferred method of conducting the reaction due to the much greater difficulty of maintaining the desired temperature at the point of polymerization within the reaction mixture. This problem is usually associated with the difficulty of maintaining sufficient and thorough mixing to effectively disperse the catalyst and the reactants throughout the entire mass of the reaction mixture and to obtain rapid and efficient heat transfer from the external cooling media to the centers of the polymerization whereby the undesirable type of polymerization with the resultant formation of liquid polymers as well as conjunct polymerization may be prevented. However, in the process of the present invention the N,N-dialkylamide which is utilized is preferably a solvent and a diluent for the reaction mixture and therefore will also act in the capacity as a dispersing agent, thereby further aiding in the control of the reaction temperature by controlling the rate of reaction and, hence the rate of liberation of the exothermic heat of reaction.

It is therefore an object of this invention to provide a method for the controlled reaction of copolymerizing an aromatic compound containing an unsaturated side chain with an alkylene diamine.

A further object of this invention is to provide a method for controlling the reaction rate and copolymerization of an aromatic hydrocarbon containing an unsaturated side chain with an alkylene diamine whereby the desired type of polymerization of monomers is effected with a corresponding decrease in the possibility of undesired types of copolymerization accompanied by the resultant formation of undesired copolymers.

One embodiment of this invention resides in a process which comprises copolymerizing an aromatic compound containing an unsaturated side chain with an alkylene diamine in an N,N-dialkylamide at a temperature in the range of from about 20° to about 80° C., in the presence of a polymerization catalyst, and recovering the resultant copolymer.

A further embodiment of this invention is found in a process which comprises copolymerizing an aromatic hydrocarbon containing an unsaturated side chain with N,N,N',N' - tetra-kis-(2-hydroxypropyl)ethylene diamine in N,N-dimethylformamide at a temperature in the range of from about 20° to about 80° C., in the presence of a polymerization catalyst, and recovering the resultant copolymer.

A still further embodiment of this invention is found in a process which comprises copolymerizing an aromatic compound containing an unsaturated side chain with an alkylene diamine in the presence of a polymerization catalyst at a temperature in the range of from about 2.̊° to about 80° C., the improvement in said process comprising the step of dissolving said aromatic compound in an N,N-dialkylamide prior to contact with said alkylene diamine and said catalyst.

A specific embodiment of the invention is found in a process which comprises copolymerizing α-methylstyrene with N,N,N',N'-tetra-kis-(2-hydroxypropyl)ethylene diamine in N,N-dimethylformamide at a temperature in the range of from about 25° to about 80° C., in the presence of a polymerization catalyst comprising a boron trifluorideethyl ether complex, and recovering the resultant copolymer.

Yet another specific embodiment of the invention is found in a process which comprises copolymerizing α-methylstyrene with N,N,N',N'-tetra-kis-(2-hydroxypropyl)-ethylene diamine in the presence of a polymerization catalyst comprising a boron trifluoride-ethyl ether complex at a temperature in the range of from about 20° to about 80° C., and recovering the resultant copolymer, the improvement in said process comprising dissolving said α-methylstyrene in N,N-dimethylformamide prior to contact with said N,N,N',N'-tetra-kis-(2-hydroxypropyl)-ethylene diamine and said boron trifluoride-ethyl ether complex.

Other objects and embodiments referring to alternative aromatic compounds containing an unsaturated side chain, alkylene diamines and N,N-dialkylamides will be found in the following further detailed description of the invention.

As hereinbefore stated the present invention is concerned with an improved process for the copolymerization of an aromatic compound containing an unsaturated side chain such as styrene with an alkylene diamine and particularly di- and tri-substituted alkylene diamines to prepare resinous compounds which are useful as adhesives or, if so desired, may be used in the preparation of surface coatings. These surface coatings will dry or will be set by the addition of heat and thus form hard surfaces which will protect the coated object beneath. These surface coatings will be resistant to acids, bases, etc., or other compounds which tend to damage the surface of the object which is coated. It has therefore now been found that the reaction rate at which the copolymerization of an aromatic compound containing an unsaturated side chain with an alkylene diamine may be easily controlled by the use of a solvent comprising an N,N-dialkylamide, said solvent acting as both a reaction rate controlling medium and as a diluent or solvent for the thorough dispersion of the reactants in the reaction mixture. It has now been discovered that the reaction may be effected at a relatively high temperature for this particular type of reaction, said temperatures being in the range of from about 20° to about 80° C. This relatively high temperature for the reaction will result in a less expensive process inasmuch as no external cooling means will be required with a correspondingly higher cost in the preparation of the desired compound.

Examples of N,N-dialkylamides which may be used in the process of this invention include N,N-dimethylformamide, N,N-diethylformamide, N,N-dipropylformamide, N,N-diisopropylformamide, N,N-dibutylformamide, N,N-diisobutylformamide, N,N-dimethylacetamide, N,N-diethylacetamide, N,N-dipropylacetamide, N,N-diisopropylacetamide, N,N-dibutylacetamide, N,N-diisobutylacetamide, N,N-dimethylpropionamide, N,N-diethylpropionamide, N,N-dipropylpropionamide, N,N-diisopropylpropionamide, N,N-dibutylpropionamide, N,N-diisobutylpropionamide, etc. It is to be understood that the aforementioned N,N-dialkylamides are only representatives of the class of compounds which may be used and that the present invention is not necessarily limited thereto.

The alkylene diamines which may be copolymerized with the aforementioned aromatic compound containing an unsaturated side chain have the generic formula:

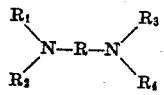

in which R is an alkyl group and $R_1$, $R_2$, $R_3$ and $R_4$ may consist of hydrogen, the same or different allkyl or substituted alkyl groups, such as N,N'-(dimethyl)ethylene diamine,
N,N,N',N'-tetra-kis-(methyl)ethylene diamine,
N,N'-(diethyl)ethylene diamine,
N,N,N',N'-tetra-kis-(ethyl)ethylene diamine,
N,N'-(dipropyl)ethylene diamine,
N,N,N',N'-tetra-kis-(propyl)ethylene diamine,
N,N'-(2-hydroxypropyl)ethylene diamine,
N,N,N',N'-tetra-kis-(2-hydroxypropyl)ethylene diamine,
N,N'-(dimethyl)propylene diamine,
N,N,N',N'-tetra-kis(methyl)propylene diamine,
N,N'-(diethyl)propylene diamine,
N,N,N',N'-tetra-kis-(ethyl)propylene diamine,
N,N'-(dipropyl)propylene diamine,
N,N,N',N'-tetra-kis-(propyl)propylene diamine,
N,N'-(2-hydroxypropyl)propylene diamine,
N,N,N',N'-tetra-kis - (2 - hydroxypropyl)propylene diamine,
N,N'-(dimethyl)butylene diamine,
N,N,N',N'-tetra-kis-(methyl)butylene diamine,
N,N'-(diethyl)butylene diamine,
N,N,N',N'-tetra-kis-(ethyl)butylene diamine,
N,N'-(dipropyl)butylene diamine,
N,N,N',N'-tetra-kis-(propyl)butylene diamine,
N,N'-(2-hydroxypropyl)butylene diamine,
N,N,N',N'-tetra-kis-(2-hydroxypropyl)butylene diamine, etc.

Examples of aromatic compounds containing an unsaturated side chain which may be copolymerized with the aforementioned alkylene diamines include styrene, α-methylstyrene, allylbenzene, isoallylbenzene, the isomeric phenylbutylenes, phenylamylenes, phenylhexylenes, etc. It is to be understood that the aforementioned alkylene diamines and aromatic compounds containing an unsaturated side chain are only representatives of the classes of compounds which may be used and that the present invention is not necessarily limited thereto.

The copolymerization of the aromatic compound containing an unsaturated side chain with the alkylene diamine is effected in the presence of a polymerization catalyst such as boron trifluoride. Another catalyst which may be used in this process comprises substantially anhydrous hydrogen fluoride containing less than about 10% by weight thereof of water. The use of substantially anhydrous hydrogen fluoride as a catalyst in the present copolymerization reaction provides certain advantages in the recovery of the desired polymer product therein preventing the undesirable deterioration of said product during the recovery operation. Thus, hydrogen fluoride may be recovered for reuse from the catalyst-polymer complex without deleterious effects upon the product by an inexpensive and simple method hereinafter described in detail. If Friedel-Crafts metal halide catalysts such as aluminum chloride, for example, are used in the reaction, they must be separated from the reaction products by washing with an active solvent such as alcohol or water. In the case of water, the aqueous phase of the hydrolyzed reaction mixture contains chemically hydrolyzed or hydrated aluminum chloride which cannot be readily treated to recover the anhydrous catalyst for recycling purposes. In the event that alcohol is used, the catalyst is similarly solvated.

The catalyst is introduced gradually into the aromatic compound containing an unsaturated side chain, the alkylene diamine and the solvent, preferably in small quantities as the reaction proceeds. If so desired the hydrogen fluoride may be added to the reaction mixture as a liquid or in gaseous form, while the boron trifluoride may be introduced in gaseous form. When the catalysts are introduced as a gas they are bubbled into the mixture as a suspension or mixture with an inert diluent gas such as nitrogen or gaseous hydrocarbons. The reaction mixture at the point of inlet of the catalyst is thoroughly agitated to obtain uniform distribution of the catalyst throughout the mixture of the reactants contacted, the total quantity of hydrogen fluoride or boron trifluoride introduced being from about 5% to about 25% of the weight of the aromatic compound containing an unsaturated side chain and alkylene diamine present. Below about 5% by weight of the reactants the quantity of hydrogen fluoride or boron trifluoride is generally insufficient to convert, in adequate yield, the monomers charged to the process to polymers thereof. Above about 25% by weight of the monomers are additional quantity of catalysts effects no useful purposes in completing or extending the copolymerization reaction.

Following completion of the desired degree of copolymerization after the addition of from about 5% to about 25% by weight of the reactants of hydrogen fluoride to the reaction mixture, the hydrocarbon must be separated from the catalyst. The catalyst may be removed from the mixture by the addition of water, aqueous hydrogen fluoride, or aqueous solutions of sodium hydroxide, potassium hydroxide, ammonia, etc., after which the aqueous phase is separated from the copolymer. While such a procedure is often convenient and produces a satisfactory hydrocarbon product, the catalyst is not recovered in condition for reuse, except in the case of aqueous hydrogen fluoride from which the anhydrous acid may be distilled in part. Other methods of catalyst removal which circumvent this difficulty will be subsequently described in greater detail. Certain oxygen-containing compounds such as alcohols, esters, ethers, phenols, etc., combine with the hydrogen fluoride to form complexes and free the polymer product. In a similar manner, certain inorganic salts such as sodium fluoride, potassium fluoride, and others combine with hydrogen fluoride to form double salts; anhydrous ammonia and the amines, and alkanol amines, which form amine hydrofluoride salts by reaction with the hydrogen fluoride in the reaction mixture, particularly the high boiling amines such as aniline, pyridine, quinoline, decylamine and their homologs, the hydrogen fluoride salts of which may be heated to recover not only the organic amine for recycle purposes, but the hydrogen fluoride as well in an anhydrous state for recycle to the copolymerization stage of the process.

The above materials which combine with the hydrogen fluoride and release the copolymer therefrom may be designated collectively as "bases," where the term "base" as utilized herein characterizes a class of materials having the general properties of being capable of combining with an acid to form a complex therewith or a neutral salt thereof.

In order to promote the separation between the copolymer product and other components of the reaction mixture, particularly the product formed by the reaction of the base with the hydrogen fluoride catalyst, a low boiling naphtha diluent or other mixture of hydrocarbons containing a large percentage of aromatic hydrocarbons such as benzene, toluene, xylene, etc., may be added to the reaction mixture following the addition of the base, the polymer product dissolving in the naphtha solvent or other aromatic hydrocarbon solvent to form a separate phase which may be decanted from the remaining reaction mixture.

In accordance with a further alternative method of recovering the hydrogen fluoride catalyst from the copolymerization reaction mixture phase and simultaneously effecting the recovery of the copolymer product, the reaction mixture obtained upon completion of the copolymerization reaction may be heated or otherwise distilled to vaporize the hydrogen fluoride or boron trifluoride from the other components of the reaction mixture. The distillation is preferably effected rapidly, for example, by flash distillation of the mixture in a distillation apparatus at normal or sub-atmospheric pressure. Further, this distillation may be carried out more efficiently in the presence or a decomposition catalyst selected from such metals and their alloys as copper, cobalt, nickel, lead, tin, and silver. The hydrogen fluoride may also be flashed therefrom by introducing the polymerization reaction mixture into a low boiling hydrocarbon naphtha maintained at a temperature of from about 50° to about 150° C., and permitting the hydrogen fluoride to flash distill from the mixture. The copolymer product is thereafter recovered from its solution with the naphtha diluent and/or the solvent, comprising in this case, an N,N-dialkyl amide, by a low temperature distillation procedure which may be effected at sub-atmospheric pressures in order to lower the temperature and thereby prevent deterioration by further polymerization of the copolymer product. The mixture, prior to distillation, may be washed successively with several portions of water or dilute caustic to remove any residual hydrogen fluoride which would adversely affect the product during the distillation.

The following examples are given to illustrate the process of the present invention, which, however, are not intended to limit the generally broad scope of the present invention in strict accordance therewith.

*Example I*

A stainless steel reactor provided with a mechanical stirrer, a thermocouple well and a hydrocarbon and catalyst inlet tube was used as the condensation apparatus in this experiment. A mixture of 25 g. of N,N,N',N'-tetra-kis-(2-hydroxypropyl)ethylene diamine in 50 g. of N,N-dimethylformamide was charged to the reactor and thoroughly admixed by mechanical stirring. Following this 20 g. of α-methylstyrene was added and 2.5 g. of a polymerization catalyst comprising a boron trifluorideethyl ether complex was bubbled into the mixture accompanied by vigorous stirring. The reactor was heated to a temperature of approximately 60° C. and stirred for an additional hour, the reactor being maintained at the desired temperature. Following this the reactor was allowed to cool to room temperature, the unreacted gases were vented, the reactor was opened and the reaction mixture was thereafter neutralized by the addition of sodium hydroxide, followed by a thorough washing with water. The desired reaction product, comprising a copolymer of α-methylstyrene and N,N,N',N'-tetra-kis-(2-hydroxypropyl)ethylene diamine, in the form of a clear, light colored, thermoplastic, resinous product was separated and recovered. This product dried to form a hard clear film.

*Example II*

A reactor similar to that described in Example I above is cooled to a temperature of about 20° C. Following this the reactor is charged with 25 g. of N,N,N',N'-tetra-kis-(ethyl)ethylene diamine in 50 g. of N,N-dimethylformamide. After thoroughly mixing 22 g. of styrene was added and 3 g. of hydrogen fluoride was slowly bubbled into the reaction mixture which is vigorously stirred during the addition. The reactor and contents thereof are heated to a temperature of about 60° C. and maintained thereat for an additional hour, the mixture being vigorously stirred during this period of time. At the end of the aforementioned period of time the reactor and contents thereof are allowed to cool to room temperature, the unreacted gases are vented and the reaction product is neutralized by the addition of sodium hydroxide. The reaction product, comprising a copolymer of styrene and N,N,N',N'-tetra-kis-(ethyl)ethylene diamine is then thoroughly washed with water and recovered, the product being in the form of a clear, light colored, thermoplastic, resinous product.

*Example III*

In this example the reactor is charged with 25 g. of N,N,N',N'-tetra-kis-(methyl)ethylene diamine and 50 g. of N,N-diethylformamide. Following this 20 g. of α-methylstyrene and 2.5 g. of a boron trifluorideethyl ether complex was added. The mixture is continuously stirred during the addition and for an additional hour after the reactor has been heated to a temperature of approximately 60° C. At the end of the reaction time the reactor and contents thereof are allowed to cool to room temperature, the unreacted gases are vented and the reaction mixture is subjected to neutralization with sodium hydroxide and washing as hereinbefore described in the above examples. The reaction product, comprising a copolymer of α-methylstyrene and N,N,N',N'-tetra-kis-(methyl)ethylene diamine, in the form of a clear, light colored, thermoplastic, resinous product is separated and recovered.

*Example IV*

In this example 25 g. of N,N'-(dimethyl)ethylene diamine in 50 g. of N,N-dimethylacetamide is added to a reactor followed by the addition of 20 g. of α-methylstyrene and 2.5 g. of a hydrogen fluoride polymerization catalyst. The addition of the latter compounds is accompanied by a vigorous stirring, said stirring being continued throughout the duration of the reaction time. The reactor is heated to a temperature of about 60° C. and maintained thereat for a period of about 1 hour, at the end of which time the reactor and contents thereof are allowed to cool to room temperature. This reaction product is neutralized with sodium hydroxide and washed with water in a manner similar to that hereinbefore set forth. The desired reaction product, comprising a copolymer of α-methylstyrene and N,N'-(dimethyl)ethylene diamine, in the form of a clear, light colored, thermoplastic, resinous product is separated and recovered.

I claim as my invention:

1. In a process of reacting a benzene hydrocarbon selected from the group consisting of styrene, alpha-methylstyrene, allylbenzene, isoallylbenzene, phenylbutylenes, phenylamylenes and phenylhexylenes with an alkylene diamine having from 1 to 4 carbon atoms in the alkylene group in contact with a polymerization catalyst selected from the group consisting of boron trifluoride, hydrogen fluoride, Friedel-Crafts metal halides and boron trifluoride-ethyl ether complex, the improvement which comprises effecting said reaction at a temperature in the range of from about 20° to about 80° C. in a solvent comprising an N,N-dialkylamide having from 1 to 4 carbon atoms in each of the alkyl groups.

2. A process as defined in claim 1 further characterized in that said benzene hydrocarbon is styrene.

3. A process as defined in claim 1 further characterized in that said benzene hydrocarbon is alpha-methylstyrene.

4. A process which comprises reacting α-methylstyrene with N,N,N',N'-tetra-kis-(2-hydroxypropyl)ethylene diamine in N,N-dimethylformamide at a temperature in the range of about 20° to about 80° C., in contact with a boron trifluoride-ethyl ether complex, and recovering the resultant reaction product.

5. A process which comprises reacting styrene with N,N,N',N'-tetra-kis-(ethyl)ethylene diamine in N,N-dimethylformamide at a temperature in the range of from about 20° to about 80° C., in contact with hydrogen fluoride, and recovering the resultant reaction product.

6. A process which comprises reacting α-methylstyrene with N,N,N',N'-tetra-kis-(methyl)ethylene diamine in N,N-diethylformamide at a temperature in the range of from about 20° to about 80° C., in contact with a boron trifluorideethyl ether complex and recovering the resultant reaction product.

7. A process which comprises reacting α-methylstyrene with N,N'-(dimethyl)ethylene diamine in N,N-dimethylacetamide at a temperature in the range of from about 20° to about 80° C., in contact with hydrogen fluoride, and recovering the resultant reaction product.

8. In a process of reacting styrene with N,N,N',N'-tetra-kis-(ethyl)ethylene diamine in contact with hydrogen fluoride at a temperature in the range of from about 20° to about 80° C., the improvement which comprises dissolving said styrene in N,N-dimethylformamide prior to contact with said alkylene diamine and said hydrogen fluoride.

9. In a process of reacting α-methylstyrene with N,N,N',N'-tetra-kis-(methyl)ethylene diamine in contact with a boron trifluoride-ethyl ether complex at a temperature in the range of from about 20° to about 80° C., the improvement which comprises dissolving said α-methylstyrene in N,N-diethylformamide prior to contact with said N,N,N',N'-tetra-kis-(methyl)ethylene diamine and said complex.

10. In a process of reacting α-methylstyrene with N,N'-(dimethyl)ethylene diamine in contact with hydrogen fluoride at a temperature in the range of from about 20° to about 80° C., the improvement which comprises dissolving said α-methylstyrene in N,N-dimethylacetamide prior to contact with said N,N'-(dimethyl)ethylene diamine and said hydrogen fluoride.

11. In a process of reacting α-methylstyrene with N,N,N',N'-tetra-kis-(2-hydroxypropyl)ethylene diamine in contact with a boron trifluoride-ethyl ether complex at a temperature in the range of from about 20° to about 80° C., the improvement which comprises dissolving said α-methylstyrene in N,N-dimethylformamide prior to contact with said N,N,N',N'-tetra-kis-(2-hydroxypropyl)-ethylene diamine and said boron trifluoride-ethyl ether complex.

References Cited in the file of this patent

UNITED STATES PATENTS 2,750,357    Bredereck et al. _____ June 12, 1956

OTHER REFERENCES

Campbell: Journal of Polymer Science, vol. 28, pages 87–96 (1958).

Gregg et al.: Journal American Chemical Society, vol. 75, pages 3530–33 (1953).

Muetterties et al.: Journal American Chemical Society, vol. 75, pages 490–1 (1953).